US012131612B2

(12) United States Patent
Visser

(10) Patent No.: US 12,131,612 B2
(45) Date of Patent: *Oct. 29, 2024

(54) GAMING SYSTEM AND METHOD OF GAMING

(71) Applicant: Aristocrat Technologies Australia Pty Limited, North Ryde (AU)

(72) Inventor: Antoon Christiaan Visser, Coogee (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,393

(22) Filed: Feb. 13, 2023

(65) Prior Publication Data

US 2023/0196880 A1 Jun. 22, 2023

Related U.S. Application Data

(63) Continuation of application No. 17/246,280, filed on Apr. 30, 2021, now Pat. No. 11,594,107, which is a (Continued)

(30) Foreign Application Priority Data

Dec. 21, 2007 (AU) ................................ 2007907070

(51) Int. Cl.
*G07F 17/32* (2006.01)

(52) U.S. Cl.
CPC ................................ *G07F 17/3267* (2013.01)

(58) Field of Classification Search
CPC .. G07F 17/3267; G07F 17/34; G07F 17/3244; G07F 17/326; G07F 17/3262;
(Continued)

(56) References Cited

U.S. PATENT DOCUMENTS 5,788,573 A * 8/1998 Baerlocher ......... G07F 17/3258 463/16
5,947,820 A * 9/1999 Morro ................. G07F 17/3258 273/299
(Continued)

FOREIGN PATENT DOCUMENTS

AU 721968 6/1998
AU 2004218630 10/2004
(Continued)

OTHER PUBLICATIONS

United States Patent and Trademark Office, "Non-Final Office Action," issued in connection with U.S. Appl. No. 12/339,720, filed Jun. 20, 2011 (9 pages).
(Continued)

*Primary Examiner* — David L Lewis
*Assistant Examiner* — Matthew D Hoel
(74) *Attorney, Agent, or Firm* — Armstrong Teasdale LLP

(57) ABSTRACT

The present invention relates to a gaming system and to a method of gaming. A game is played by displaying a representation of selection of a plurality of symbols from a set of symbols. The game enables selection of at least one additional symbol in addition to those originally selected, to increase the number of symbol combinations available for assessing a game outcome. In an example, the additional symbol is displayed as being mounted on a substrate which is "flipped" to reveal the additional symbol. Another face of this substrate mounts the originally selected symbol. A plurality of additional symbols may be available for selection.

20 Claims, 9 Drawing Sheets

Related U.S. Application Data continuation of application No. 16/440,707, filed on Jun. 13, 2019, now Pat. No. 11,004,308, which is a continuation of application No. 16/020,023, filed on Jun. 27, 2018, now Pat. No. 10,366,575, which is a continuation of application No. 13/953,295, filed on Jul. 29, 2013, now abandoned, which is a continuation of application No. 12/339,720, filed on Dec. 19, 2008, now Pat. No. 8,517,814.

(58) Field of Classification Search
CPC ............. G07F 17/3265; G07F 17/3269; G07F 17/3209; G07F 17/3213
See application file for complete search history.

(56) References Cited

U.S. PATENT DOCUMENTS

| | | | | | |
|---|---|---|---|---|---|
| 6,062,978 | A * | 5/2000 | Martino | A63F 9/24 | 463/9 |
| 6,089,977 | A * | 7/2000 | Bennett | G07F 17/34 | 463/20 |
| 6,162,121 | A * | 12/2000 | Morro | G07F 17/32 | 463/16 |
| 6,168,520 | B1 * | 1/2001 | Baerlocher | G07F 17/32 | 463/16 |
| 6,319,124 | B1 * | 11/2001 | Baerlocher | G07F 17/34 | 463/31 |
| 6,837,021 | B2 * | 1/2005 | Sudo | E06B 11/02 | 49/501 |
| 6,918,834 | B2 * | 7/2005 | Vancura | G07F 17/3269 | 463/16 |
| 7,029,395 | B1 * | 4/2006 | Baerlocher | G07F 17/3244 | 463/16 |
| 7,316,613 | B2 * | 1/2008 | Luccesi | G07F 17/32 | 463/16 |
| 8,021,225 | B2 * | 9/2011 | Okada | G07F 17/32 | 463/16 |
| 9,940,794 | B2 * | 4/2018 | Comeau | G07F 17/34 | |
| 10,332,335 | B2 * | 6/2019 | Halvorson | G07F 17/3251 | |
| 10,354,497 | B2 * | 7/2019 | Comeau | G07F 17/3265 | |
| 10,573,121 | B2 * | 2/2020 | Halvorson | G07F 17/3209 | |
| 10,733,834 | B1 * | 8/2020 | Hiten | G07F 17/3288 | |
| 10,803,697 | B2 * | 10/2020 | Penacho | G07F 17/3262 | |
| 10,818,140 | B2 * | 10/2020 | Halvorson | G07F 17/3244 | |
| 10,854,040 | B1 * | 12/2020 | Däumling | G07F 17/3225 | |
| 10,957,161 | B2 * | 3/2021 | Chesworth | G07F 17/323 | |
| 11,017,638 | B2 * | 5/2021 | Chesworth | G07F 17/3213 | |
| 11,094,170 | B2 * | 8/2021 | Chesworth | G07F 17/3251 | |
| 11,127,264 | B2 * | 9/2021 | Comeau | G07F 17/3265 | |
| 2003/0045343 | A1 * | 3/2003 | Luccesi | G07F 17/32 | 463/20 |
| 2003/0064805 | A1 * | 4/2003 | Wells | G07F 17/32 | 463/16 |
| 2004/0023714 | A1 * | 2/2004 | Asdale | G07F 17/32 | 463/22 |
| 2004/0106449 | A1 * | 6/2004 | Walker | G07F 17/3227 | 463/25 |
| 2004/0198489 | A1 * | 10/2004 | Kaminkow | G07F 17/3265 | 463/20 |
| 2006/0111173 | A1 * | 5/2006 | Yang | G07F 17/3286 | 463/20 |
| 2006/0148560 | A1 | 7/2006 | Arezina | | |
| 2006/0205469 | A1 * | 9/2006 | Schultz | G07F 17/32 | 463/16 |
| 2007/0149267 | A1 * | 6/2007 | Ross | G07F 17/3262 | 463/13 |
| 2007/0287529 | A1 * | 12/2007 | Kojima | G07F 17/34 | 463/20 |
| 2008/0132321 | A1 * | 6/2008 | Pau | G07F 17/32 | 463/43 |
| 2008/0274789 | A1 * | 11/2008 | Singer | G07F 17/3211 | 463/20 |
| 2009/0079133 | A1 * | 3/2009 | Wilson | A63F 1/04 | 273/292 |

FOREIGN PATENT DOCUMENTS

| | | |
|---|---|---|
| WO | 2005029417 | 3/2005 |
| WO | 2008116125 | 9/2008 |

OTHER PUBLICATIONS

United States Patent and Trademark Office, "Final Office Action," issued in connection with U.S. Appl. No. 12/339,720, dated Feb. 1, 2012 (13 pages).

United States Patent and Trademark Office, "Notice of Allowance," issued in connection with U.S. Appl. No. 12/339,720, filed Apr. 30, 2013 (9 pages).

"The Silicon Gaming Odyssey Slot Machine," by Levinthal, et al., IEEE Xplore database, 1063-6390/97, published 1997.

Office Action dated Jan. 27, 2021 for U.S. Appl. No. 16/219,598 (pp. 1-12).

AU Examination Report for AU Application No. 2012202114, dated Jan. 14, 2013. 2 Pages.

AU Examination Report for AU Application No. 2008261161, dated Feb. 1, 2012. 2 Pages.

AU Examination Report for AU Application No. 2014250617, dated Aug. 24, 2015. 2 Pages.

AU Examination Report for AU Application No. 2008261161, dated Jul. 15, 2010. 2 Pages.

AU Examination Report for AU Application No. 2008261161, dated Apr. 13, 2012. 2 Pages.

Office Action dated Oct. 7, 2020 for U.S. Appl. No. 16/440,707 (pp. 1-14).

Office Action dated Sep. 22, 2020 for U.S. Appl. No. 16/219,598 (pp. 1-10).

Notice of Allowance dated Apr. 7, 2021 for U.S. Appl. No. 16/440,707 (pp. 1-12).

Australian Examination Report No. 1 for App. No. AU2020202675, dated May 1, 2021, 2 pages.

Office Action (Non-Final Rejection) dated Apr. 22, 2022 for U.S. Appl. No. 17/246,280 (pp. 1-11).

Office Action (Notice of Allowance and Fees Due (PTOL-85)) dated Dec. 1, 2022 for U.S. Appl. No. 17/246,280 (pp. 1-10).

Australian Examination Report No. 1 issued in App. No. AU2022202910, dated Jul. 3, 2023, 3 pages.

Australian Examination Report No. 2 issued in App. No. AU2022202910, dated Jun. 28, 2024, 2 pages.

* cited by examiner

GAMING SYSTEM AND METHOD OF GAMING

CROSS-REFERENCE TO RELATED APPLICATIONS

This application is a continuation of and claims the benefit of U.S. patent application Ser. No. 17/246,280, filed Apr. 30, 2021, entitled "GAMING SYSTEM AND METHOD OF GAMING," which is a continuation of and claims the benefit of U.S. patent application Ser. No. 16/440,707, now U.S. Pat. No. 11,004,308, filed Jun. 13, 2019, entitled "GAMING SYSTEM AND METHOD OF GAMING," which is a continuation of and claims the benefit of U.S. Pat. No. 10,366,575, filed Jun. 27, 2018, entitled "GAMING SYSTEM AND METHOD OF GAMING," which is a continuation of and claims the benefit of U.S. patent application Ser. No. 13/953,295, filed Jul. 29, 2013, entitled "A GAMING SYSTEM AND METHOD OF GAMING," which is a continuation of and claims the benefit of U.S. Pat. No. 8,517,814, filed on Dec. 19, 2008, entitled "A GAMING SYSTEM AND METHOD OF GAMING", which claims the benefit of priority to Australian Provisional Patent Application No. 2007907070, filed on Dec. 21, 2007, entitled "A GAMING SYSTEM AND METHOD OF GAMING", each of which is hereby incorporated by reference in its entirety for all purposes.

FIELD OF THE INVENTION

The present invention relates to a gaming system and to a method of gaming.

BACKGROUND OF THE INVENTION

It is known to provide a gaming system which comprises a game controller arranged to randomly select and cause the display of several symbols from a predetermined set of symbols and to determine a game outcome, such as a game win, based on the displayed symbols. Such gaming systems may commonly be implemented as a stepping machine provided with reels with each reel carrying several symbols of the set, or a video machine wherein selected symbols are displayed on virtual reels on a graphical display device. Win outcomes can occur based on symbols appearing in one or more horizontal lines, diagonal lines, or any other predetermined way. Typically five reels across are provided on the display (although less or more may be provided). Each reel or virtual reel display is three symbols high in the display window for the reel (although, again, this may be more or less symbols high).

In many gaming systems, a player can choose whether or not to wager on one or more win lines for each play of the game. The value of the wager for each win line may be determined by the player. A prize awarded to the player for a winning combination on a win line will generally be in proportion to the amount of credits bet for that win line by the player. This is perceived to be fair, as the more credits that the player is willing to risk, the higher the potential return.

While it is a simple matter to scale the amount of prize return with regard to the amount of credit bet by the player for prizes that are of known value for a winning combination, it is not possible to do this for jackpot prizes, which accumulate over a period of time, or prizes of fixed value, e.g. a car. Jackpot prizes may, for example, depend on a percentage amount of credits entered into a gaming system over a period of time, or even a percentage amount of credits entered into linked gaming machines (linked jackpots) over a period of time. Winning of the jackpot is generally independent of the amount of credit wagered on any particular win line by a player. This is perceived as being unfair to players who are willing to wager large amounts of credit in order to win a jackpot.

SUMMARY OF THE INVENTION

In accordance with a first aspect, the present invention provides a gaming system, including a game controller arranged to control play of a game, and a display arranged to display a representation of play of the game, the game controller being arranged to select a plurality of symbols from a set of symbols for play of the game, and to control the display to display a plurality of the selected symbols in one or both of rows and columns, the game controller being arranged to select at least one additional symbol, and to control the display to display the additional symbol in place of one of the originally selected symbols.

In an embodiment, the game controller is arranged to determine a game outcome based on the symbol selection. In an embodiment, providing the at least one additional symbol enables more combinations of symbols to be achieved for the determination of game outcomes.

In an embodiment, the game controller is arranged to select a plurality of additional symbols.

In an embodiment, the game controller is arranged to control the display to display the additional symbol by appearing to turn over the originally selected symbol to reveal the additional symbol behind the originally selected symbol. In an embodiment, the display is controlled such that the originally selected symbol appears to be mounted on a face of a substrate which appears to turn over so that another face of the substrate appears bearing the additional symbol. In an embodiment, the display is controlled such that the originally selected symbol appears to be mounted on one face of a three dimensional substrate having a plurality of faces, the substrate appearing to turn so that another of the faces of the three dimensional substrate appears bearing the additional symbol. In this embodiment, further turns of the three dimensional substrate may reveal further additional symbols. The three dimensional substrate may be a triangular prism, a rectangular prism, or a multi sided prism. The three dimensional substrate may be of any shape, with any number of faces. These embodiments have the advantage of creating a graphically interesting game operation in order to increase player entertainment and interest.

In an embodiment, the game may be played utilising player credit. In an embodiment, an opportunity to obtain one or more additional symbols may be bought by the player, based on credit input by the player. In one embodiment, an additional symbol may include a jackpot symbol, which, together with other jackpot symbols in a combination, may enable a player to win a jackpot if the symbol appears in the appropriate pattern. In an embodiment, a number of jackpot symbols available as additional symbols increases in proportion to the amount of credit wagered by the player, whereby to increase the chances of the player being able to win a jackpot in dependence upon the amount of credit wagered. This embodiment has the advantage that players who are willing to gamble higher amounts of credit to win the jackpot have a better chance of winning the jackpot, which is perceived to be fairer than prior art gaming machines where a chance of winning the jackpot does not vary in dependence on the amount wagered.

In accordance with a second aspect, the present invention provides a method of gaming, including the steps of selecting a plurality of symbols from a set of symbols for play of a game, controlling a display to display at least a plurality of the selected symbols in symbol positions in one or both of rows and columns, selecting at least one additional symbol and controlling the display to display the additional symbol in the place of one of the originally selected symbols.

In accordance with a third aspect, the present invention provides a computer program including instructions for controlling a computer to implement a gaming system in accordance with the first aspect of the invention.

In accordance with a fourth aspect, the present invention provides a computer readable medium providing a computer program in accordance with the third aspect of the invention.

In accordance with a fifth aspect, the present invention provides a data signal including a computer program in accordance with the third aspect of the invention.

BRIEF DESCRIPTION OF THE FIGURES

Features and advantages of certain embodiments of the present invention will become apparent from the following description of embodiments thereof, by way of example only, with reference to the accompanying drawings, in which.

Figure 1:
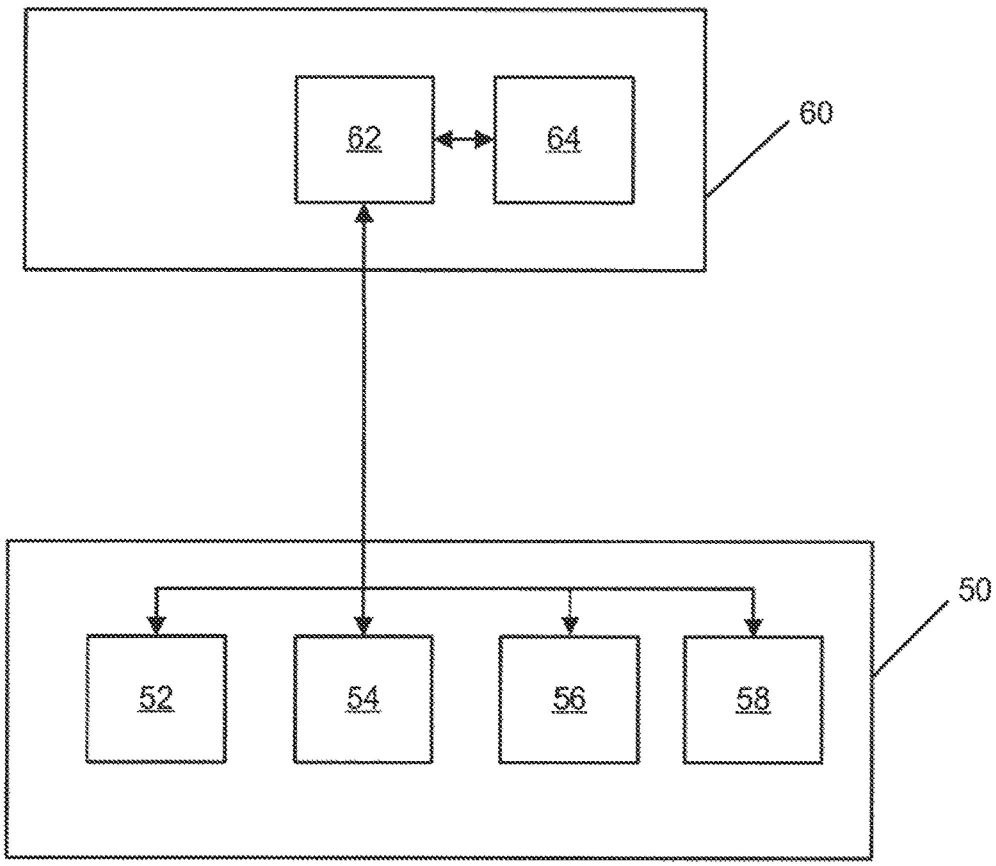
FIG. 1 is a schematic block diagram of core components of a gaming system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EMBODIMENTS

Referring to the drawings, there is shown a gaming system arranged to implement a game in which a plurality of symbols from a set of symbols is selected and displayed in symbol positions in one or both of rows and columns. In this embodiment (see FIG. 7) an example display 400 displays symbols 401 in a plurality of rows and columns. In this embodiment, the gaming system is arranged to select at least one additional symbol and control the display to display the at least one additional symbol replacing an originally selected symbol. In this example, the original symbol being replaced is represented as being mounted by substrate 402 which is “flipped” (see FIG. 8) to reveal an additional symbol 403 (FIG. 9, for example) on the reverse side of the substrate 402. Provision of the additional symbols advantageously enables the gaming system to offer more combinations of symbols to the player, more chance of winning a prize and potentially higher value prizes. In one embodiment, this also enables a number of jackpot winning symbols available to be increased in accord with the amount of credit bet by the player.

The gaming system can take a number of different forms.

In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a “thick client” architecture may be used wherein part of the game is executed on a player operable gaming machine and part of the game is executed remotely, such as by a gaming server; or a “thin client” architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, “thick client” mode or “thin client” mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment hut will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term “processor” is used to refer generically to any device that can process game play instructions in accordance with game play rules and may include: a microprocessor, microcontroller, programmable logic device or other computational device, a general purpose computer (e.g. a PC) or a server.

Figure 2:
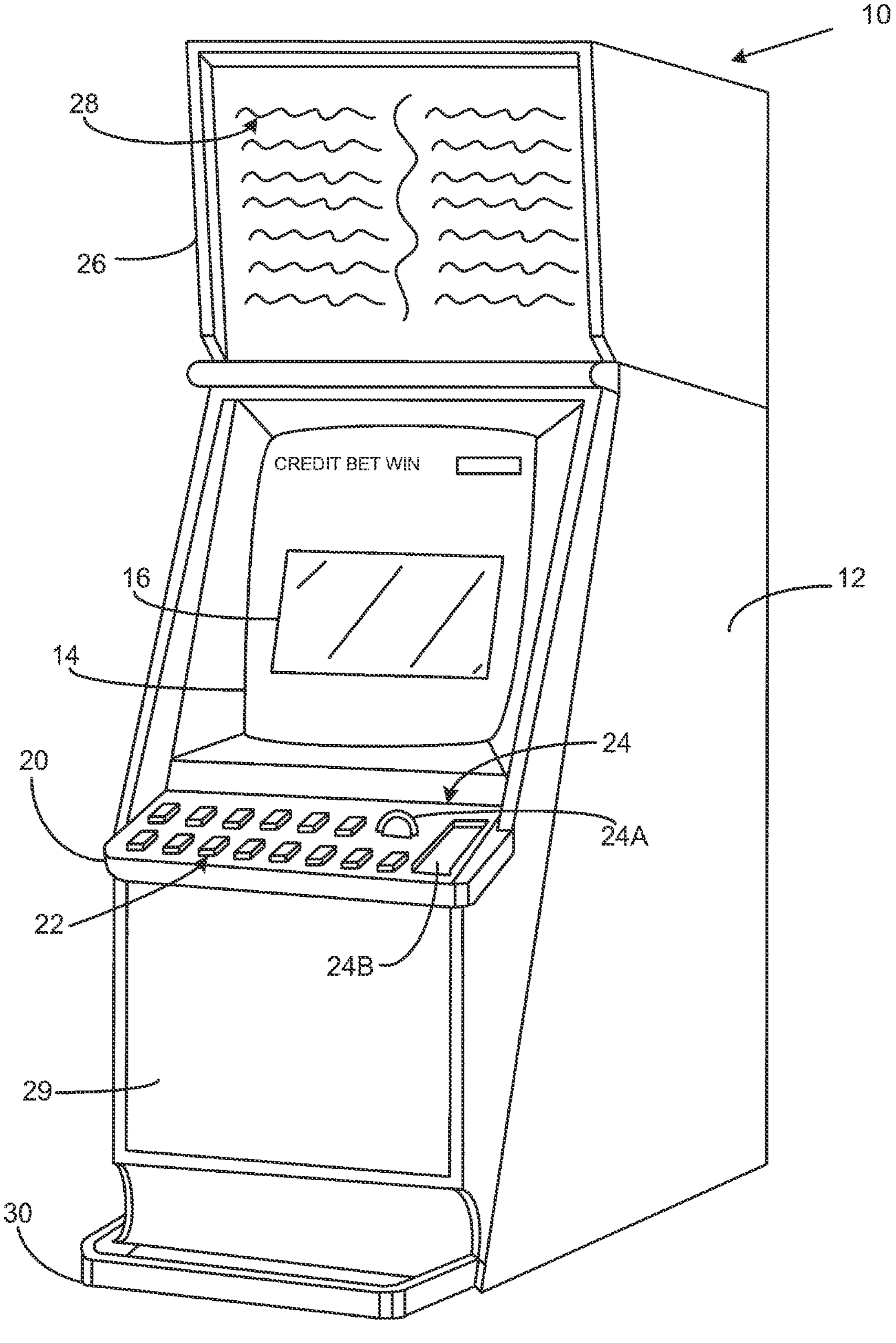
FIG. 2 is a diagrammatic representation of a gaming system in accordance with an embodiment of the present invention with the gaming system implemented in the form of a stand alone gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during gameplay. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
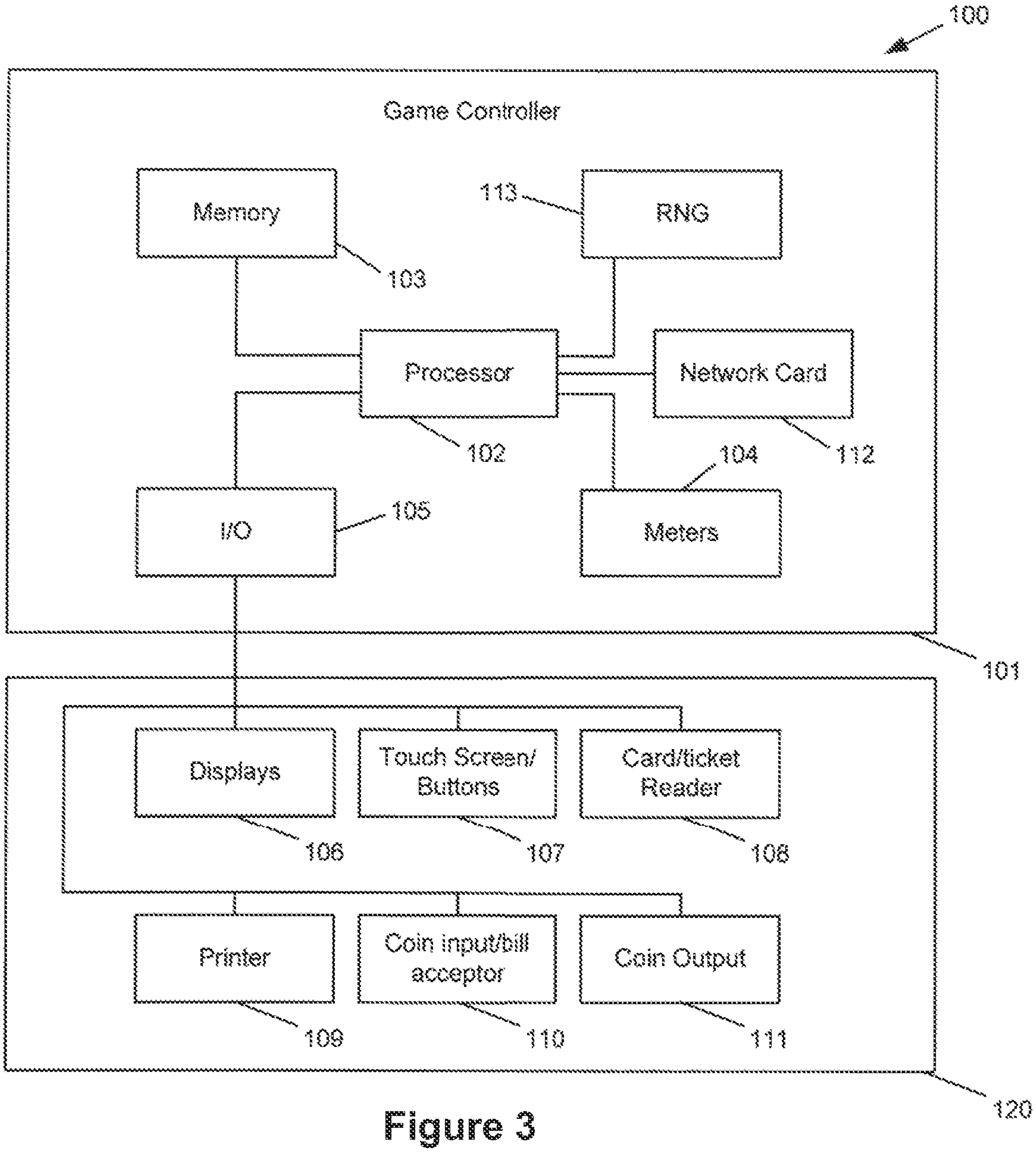
FIG. 3 is a schematic block diagram of operative components of the gaming machine shown in FIG. 2.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen 107 (note that in other embodiments buttons or other player interface could be used), a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
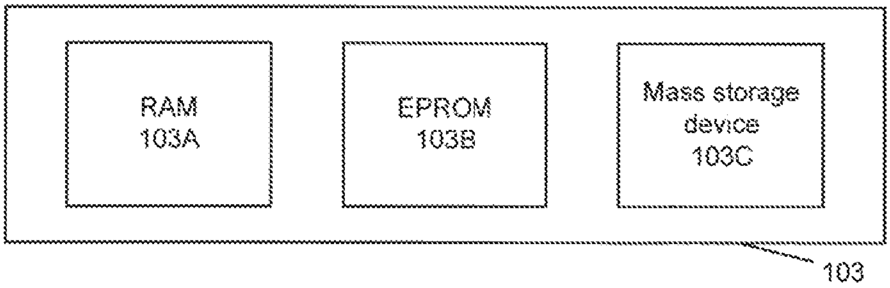
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
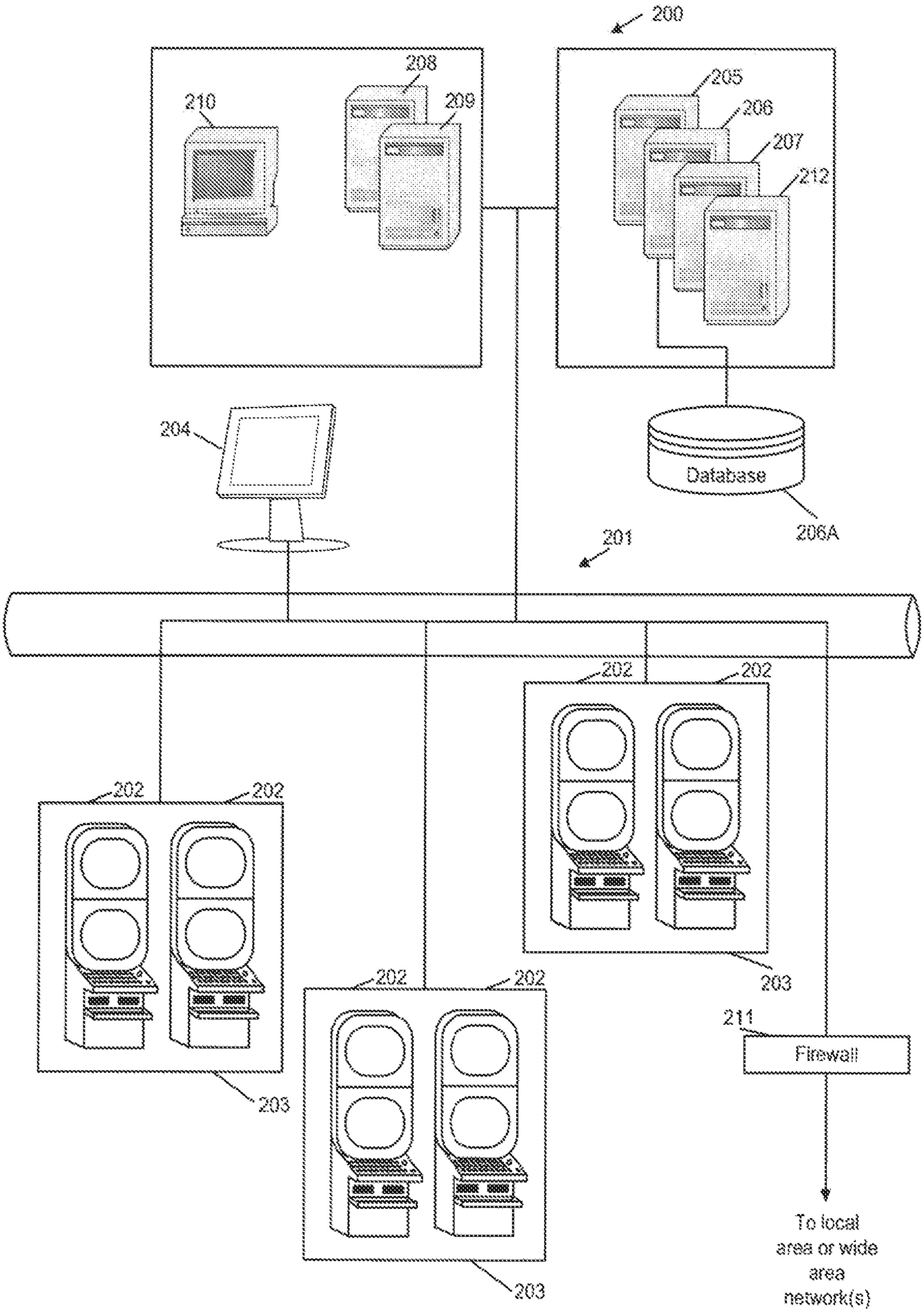
FIG. 5 is a schematic diagram of a gaming system in accordance with an alternative embodiment of the present invention with the gaming system implemented over a network.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games based on the terminals.

Figure 6:
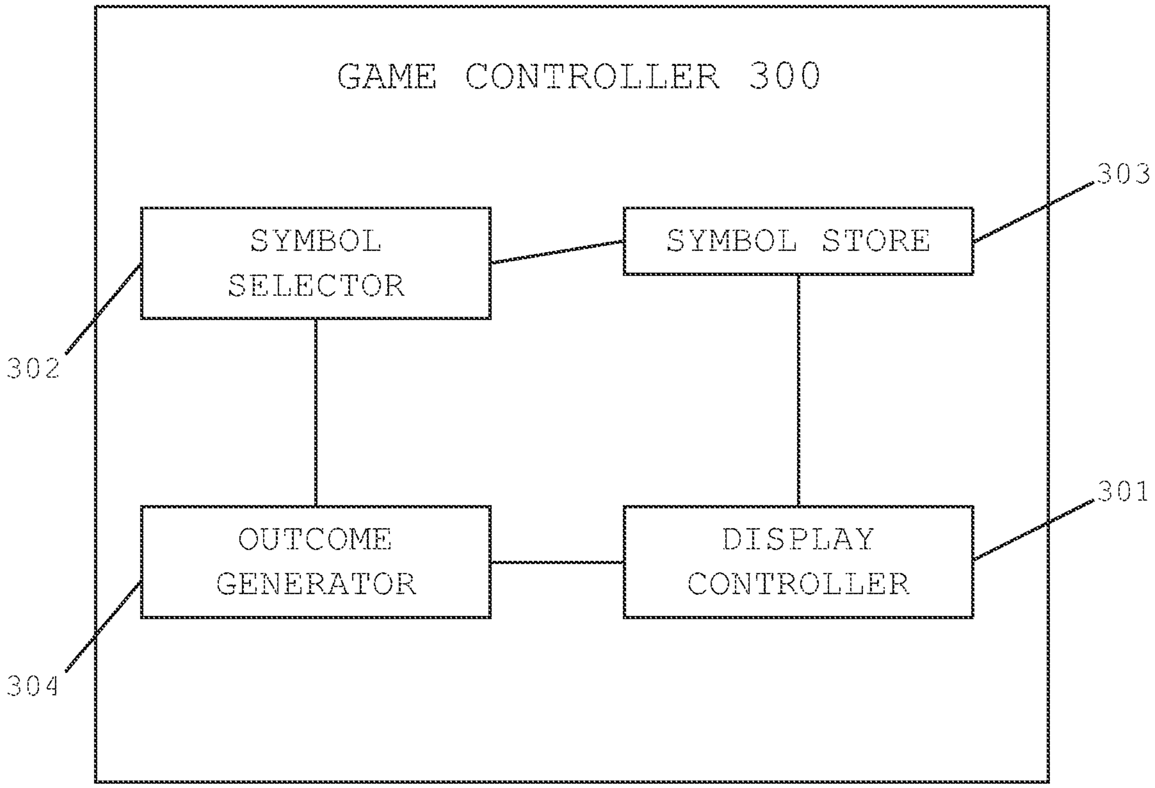
FIG. 6 is a schematic diagram of functional components of a gaming system in accordance with an embodiment of the present invention.

Referring to FIG. 6, the functionality of embodiments of the present invention may be implemented by a game controller having the functional components illustrated. In this embodiment, the functional components are implemented utilising a processor and memory (such as processor 102 and memory 103 in FIG. 3, or processor 62 and memory 64 in FIG. 1, for the game server 205 in FIG. 5), and associated programming. Other implementations are envisaged. For example the functional blocks of FIG. 6 may be implemented in hardware as separate units, or a combination of hardware and software as separate units. Any practical implementation of these functional units may be employed.

In this embodiment, the game controller 300 is arranged to control the gaming system to play a game which includes selection of a plurality of symbols from a set of symbols. The game is implemented as a "reel" game. The game controller 300 includes a display controller 301 which is arranged to control the display (reference numerals 54, 14, 106, 204 of previous figures) to emulate a representation of reels bearing symbols. Alternatively, the display may include a stepper motor and physical reels bearing the symbols.

The game controller 300 includes a symbol selector 302 which is arranged to select a plurality of symbols from a set of symbols available in a symbol store 303. An outcome generator 304 is arranged to determine an outcome of the game. In this embodiment, the outcome of the game depends on the selected symbols and may include a win outcome, loss outcome, trigger outcome, a feature outcome or other outcome. Outcomes may be determined on the basis of symbols appearing in one or more horizontal lines, diagonal lines, or any other pre-determined combinations.

Figure 7:
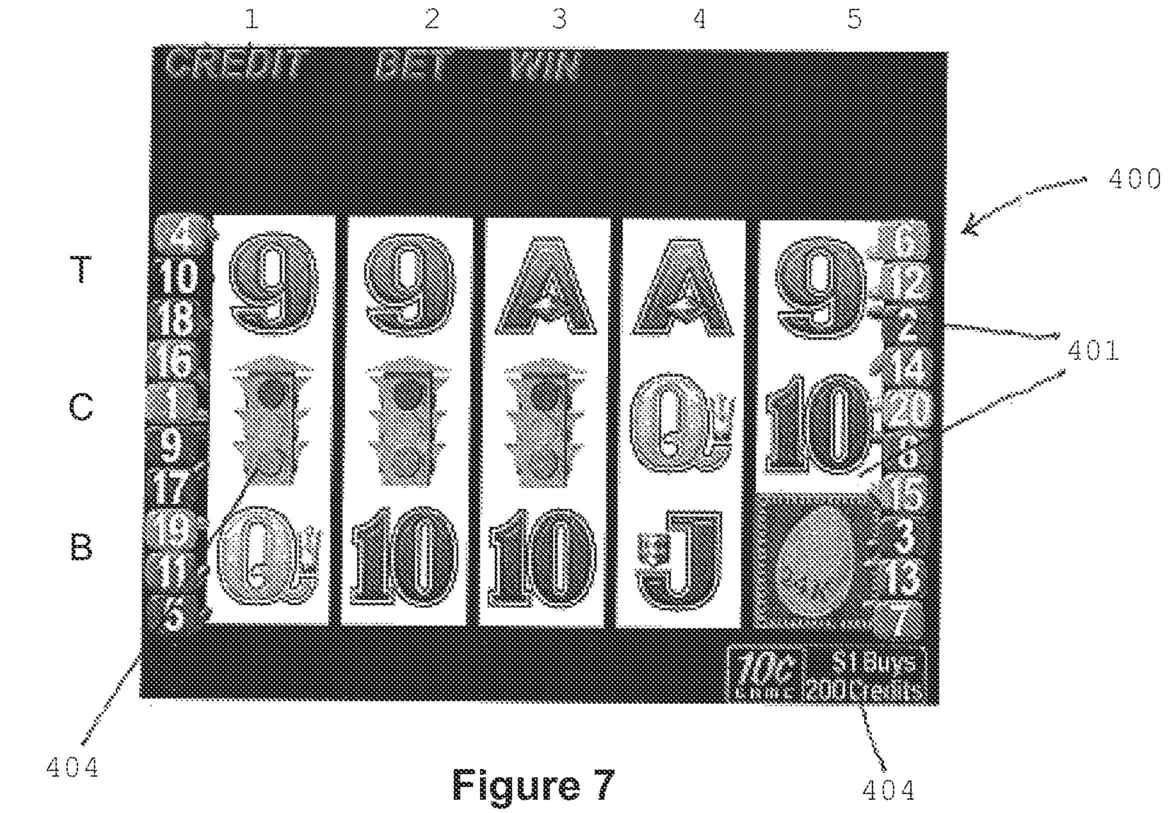
FIGS. 7 to 12 are representations of example displays generated by a gaming system in accordance with an embodiment of the present invention.

FIG. 7 shows a representation of a gamine machine display 400 which, in the example shown, has five reels (numbered "1" to "5"). The display 400 shows three reel positions high when the reels have stopped/the symbols have been selected. The reel positions are designated Bottom ("B"), Centre ("C") and Top ("T"). This is a typical reel-type display for a gaming machine. It will be appreciated that in other embodiments the number of reel positions may be more or less than in display 400. Also the number of reels may be more or less than in the display 400.

The reels may be virtual reels, generated as a video display from the selected symbols, actual mechanical reels carrying the symbols and driven by a stepper motor, or any other reel arrangement or emulation. In the case of actual physical reels, the game controller drives a stepper motor to randomly select the symbols appearing in the display 400.

The game outcome is determined by the outcome generator 304 based on combinations of symbols selected and appearing in the display 400. The symbols may be any symbols. As will be appreciated, many different types of symbols are used in gaming systems. A set of symbols may include standard symbols and function symbols. For example, standard symbols may resemble fruit such as apples, pears and bananas with a win outcome being determined when a predetermined number of the same fruit appear on a display in the same line, scattered, and so on. The function associated with a function symbol may be a "wild" function wherein display of the function symbol is treated during consideration of the game outcome as any of the standard symbols. Other functions may include scatter functions, multiplier functions, repeat win functions, jackpot functions and feature commencement functions.

In the example shown in FIG. 7, the symbols are representations of cards. In this example, a winning hand appearing on the C line may cause the outcome generator to determine that a Win has occurred and that an appropriate prize may be awarded. For example, five of a kind (e.g. 5 jacks "J", 5 tens "10" etc) on the C line may result in a win.

In addition to the card symbols there are other symbols, including "traffic light" 405 symbols which may be function symbols and also "wild card" symbols 404. In this example, there are also "jackpot" symbols which, when selected, enable a jackpot prize to be awarded. A jackpot symbol is shown as reference 403 in FIG. 9.

The diagram shown in FIG. 7 is one way of representing the symbols only. It will be appreciated that in other embodiments of the invention symbols may be represented in different ways, using any type of fancy artwork, or in any appropriate manner.

Operation of an embodiment of the present invention will now be described with reference to FIGS. 7 through 10.

Referring to FIG. 7, the symbol selector 302 selects a plurality of symbols from symbols available from the symbol store 303. The game controller 300 operates via the display controller 301 to emulate spinning of reels in the display 400. The selected symbols 401 are "spun up" on the reels. This is how a conventional video animated reel spinning game operates. A game outcome is determined by the outcome generator 304 depending upon line or scattered combinations (or other features, such as bonus awards) of the symbols appearing in the display 400. With this basic reel game, however, there are a limited number of symbol combinations available. In this embodiment of the invention, in order to provide further opportunities for awarding of prizes to players, the game controller 300 is also arranged to select additional symbols which may be used to provide additional opportunities for combinations which may lead to prize winning results.

Figure 8:
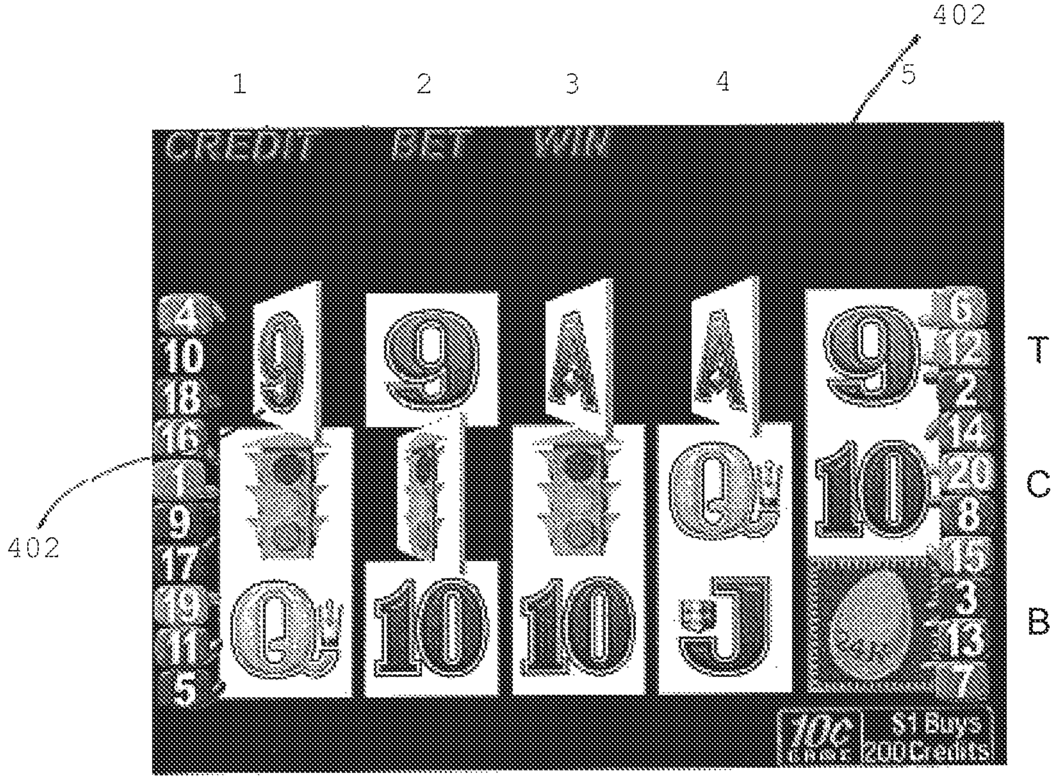
Figure 9:
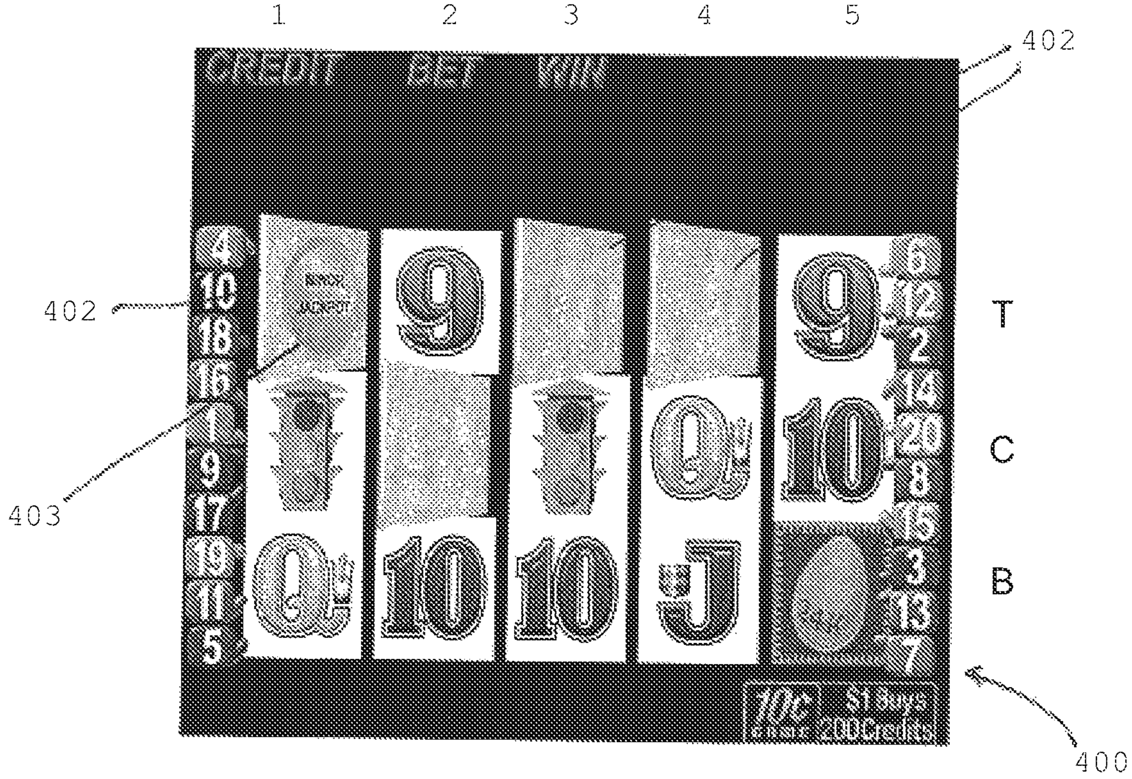
Figure 10:
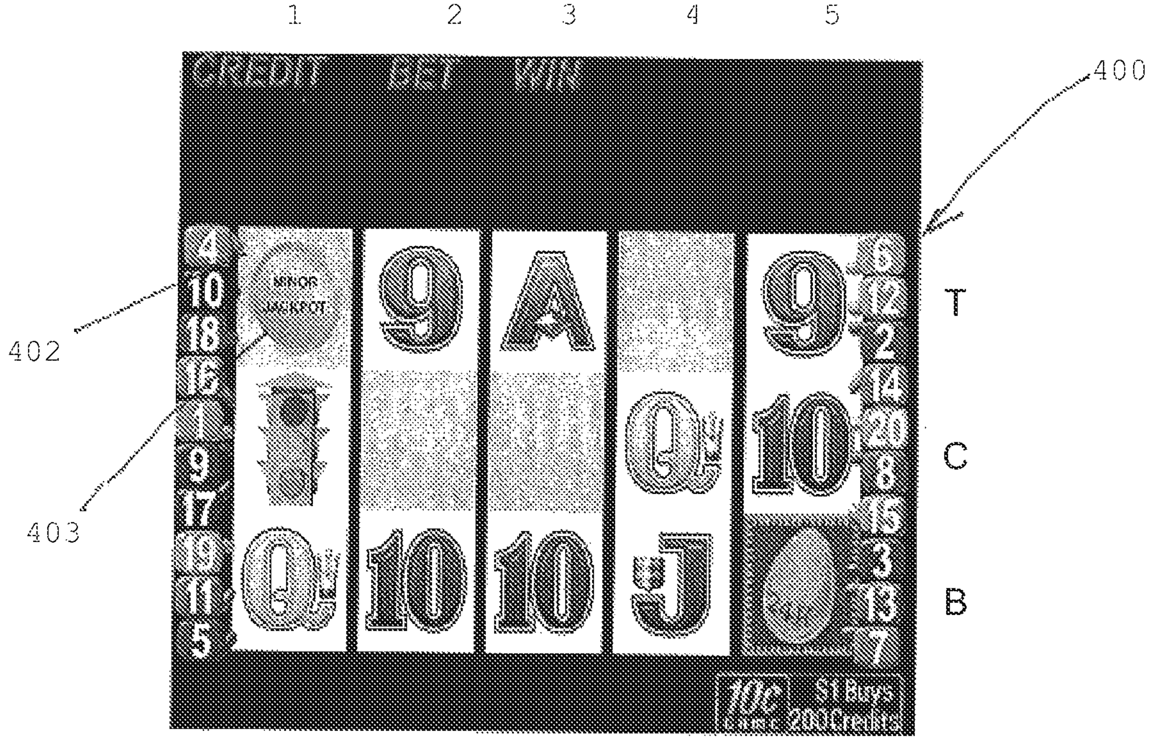

In this embodiment, the additional symbols may be revealed by "flipping" originally selected symbols, the additional symbols appearing on the reverse side of the "flipped" originally selected symbol. In this example, the selected symbols are displayed as being mounted by a substrate 402 which the display controller 301 controls so that the substrate 402 appears to turn over ("flip") so that any symbol on the other side of the substrate 402 is revealed. FIG. 8 shows four symbols in the process of being flipped. FIG. 9 shows the flips in the process of being completed. The reverse side of three of the substrates 402 are blank, no additional symbols being provided for these. On the flipped symbol in column 1, however, a "minor jackpot" symbol is revealed. FIG. 10 shows the display 400 after the symbol flips have been completed.

Providing a facility for additional symbols to be awarded to a player and for graphics to display those additional symbols by flipping the originally selected symbols to reveal the additional symbols, provides additional opportunities for a player to win prizes as well as a graphically entertaining game.

In the example game illustrated in FIGS. 7 to 10, any jackpot symbol that is spun up or achieved by a flip, gives the player a chance of winning a jackpot. The jackpot may be a linked jackpot (several machines contributing to central jackpot) or a jackpot of a stand alone machine. In this particular game, when three "mini jackpot" symbols are spun up, a mini jackpot is won, when four "minor jackpots" symbols are spun up, a minor jackpot is won and when five "major jackpot" symbols are spun up a maximum jackpot is won. If no jackpot is won, but a jackpot symbol is revealed, a small amount of credits are paid to the player to avoid disappointment of the player. In the example shown in FIG. 10, a minor jackpot symbol has been revealed by a flip in column 1, row T and a small amount of credit is allocated to the player for the minor jackpot symbol.

The awarding of one or more "flips" to a player may be caused by any trigger criteria. Triggers may include a measurement of time that the player has been playing the machine, a particular amount of waiting activity on that machine, it may be based on playing player tracking information, or may be a random event, or based on a particular combination being spun up in the original symbol selection, or any other trigger. It may be based on a combination of these criteria.

Whether or not a player is awarded one or more flips may also be based on player credit. In this embodiment, for example, the player has the option to "buy" a number of flips by increasing the amount of credit that they bet on the game e.g. that they bet on particular pay lines of the game.

The ability to buy additional symbols in the form of flips can address a perceived problem with the chance of winning jackpots. A problem with jackpots is that the winning of a jackpot is generally independent of the number of credit units wagered by a player. Players who are willing to bet more credits to win a jackpot e.g. more credits per line, have only as much chance as a player who is willing to bet only a small number of credits per line. This is perceived as being unfair to players who are willing to gamble higher (in order to win the jackpot) than other players.

In this embodiment, a player who bets more credits may receive more symbol flips, giving them additional chances to obtain jackpot symbols, for example, and therefore a better chance of winning a jackpot.

In this embodiment, the number of flips increases in proportion to the amount of credit a player is willing to wager. Also, a number of jackpot symbols available for selection from the symbol store, as additional symbols being available to be flipped, may also increase in proportion to the amount of credit wagered, so that a player has a better chance of winning the jackpot if they wager more credits.

In one variation of this game, the right to flip symbols occurs if, in any of the original symbols selected, the player receives at least one jackpot symbol on a pay line. For example, a player spins the reels and gets jackpot symbol and A, K, Q, 10 on the reels. A player who pays only one credit per line merely gets to flip one symbol. The best result that the player can get with one flip is two jackpot symbols which awards a relatively low prize.

A player who pays four credits per line, however, gets to flip all four non jackpot symbols on the same line, which gives them a more substantial chance for improving to a jackpot. If a player bets ten credits per line, they get ten flips so that the symbols can flip multiple times (for example Where the symbol bearing substrate is multi sided, see later on in this description with regard to FIG. 12).

In this embodiment, the number of flips available is changed to match the bet and the method of winning the jackpot. If a jackpot is triggered by a combination on a line, for example, the number of flips will match the bet per line. If a jackpot triggered on a scattered combination, the number of flips will match the bet per line times the cost of the lines purchased (e.g. bet fifty lines at one credit buys two lines at five credits per line, the number of flips is 25×5=75).

Figure 11:
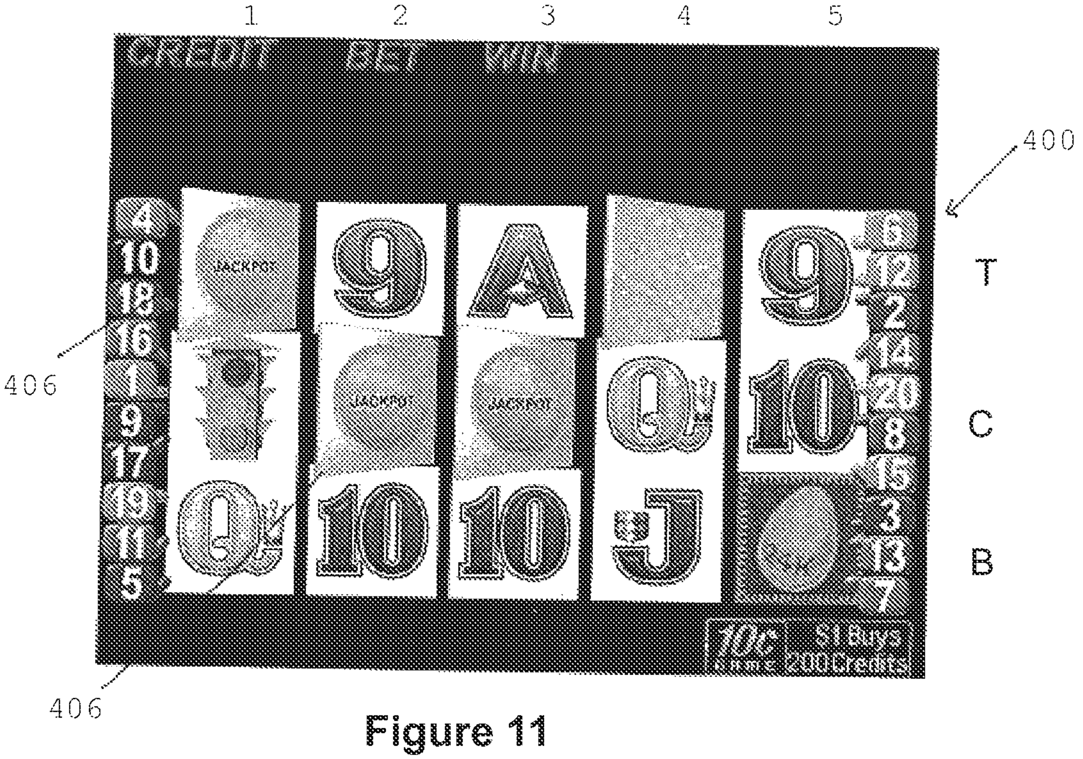

FIG. 11 shows an example where four flips have been awarded to the player and three of these are major jackpot 406 symbols. The player may win a prize for three jackpot symbols (the jackpot is won by five jackpot symbols in the embodiment of FIG. 11).

Figure 12:
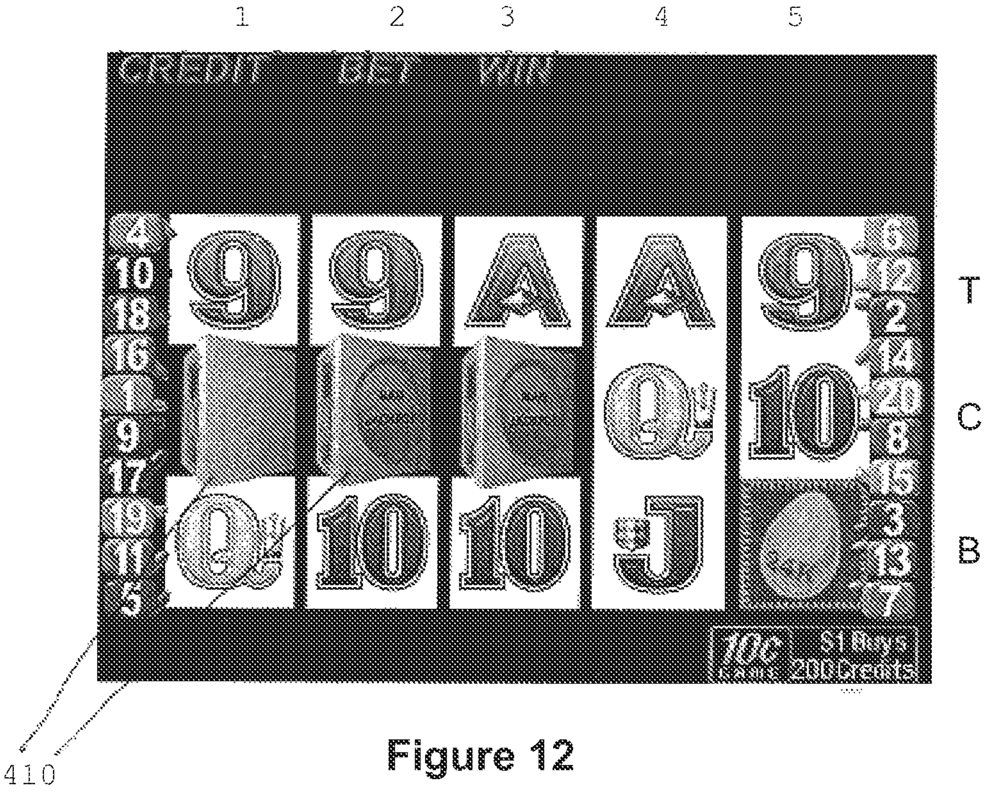

FIG. 12 shows an embodiment of the invention where the display is controlled such that the originally selected symbol appears to be mounted on a face of a three dimensional substrate 410 having a plurality of faces. In the embodiment of FIG. 12 the three dimensional substrate is represented as a triangular prism. Each face may bear a symbol (such as a "maxi jackpot" as shown in FIG. 12) or may be blank.

The following description gives two examples of how a game may be played in accordance with an embodiment of the present invention:

Example 1—Winning a Jackpot by Combinations on a Line

Player is playing 3 lines and bet 5 credits per line.

Jackpots are won as follows 3 jackpot symbols on a line pay a mini jackpot 4 jackpot symbols on a line pay a minor jackpot 5 jackpot symbols on a line pay a major jackpot The rules of the game define 1. The player has the right to flip a symbol whenever one or more jackpot symbols appears on a purchased pay-line.
2. The number of flips is equal to the number of credits bet per line.
3. A symbol can be flipped more than once
4. The reel strips remain constant for all bets per line. (the chance of getting jackpot symbol on a line is 1 in 10)

The reels spin and the player sees

| | | | | |
|---|---|---|---|---|
| A | K | Q | J | 10 |
| 9 | WILD | JACKPOT | A | K |
| J | 10 | 9 | Q | A |

No prize is payable but because a Jackpot symbol is on a purchased payline, the player has the right to flip. The number of flips is equal to the bet per line which is 5.

The player flips the symbols on the centre line on reels 1, 4 and 5

The result is

| | | | | |
|---|---|---|---|---|
| A | K | Q | J | 10 |
| JACKPOT | WILD | JACKPOT | 10 | 7 |
| J | 10 | 9 | Q | A |

The player has 2 flips remaining. The player selects to flip the centre line reels 4 and 5

The result is

| | | | | |
|---|---|---|---|---|
| A | K | Q | J | 10 |
| JACKPOT | WILD | JACKPOT | JACKPOT | 9 |
| J | 10 | 9 | Q | A |

The outcome is evaluated and the player has 4 jackpots on the centre line. (Wild substitutes for jackpot).

Player wins the minor jackpot.

If the player had bet 1 credits with 1 credit per line, the chance of 3 or more jackpot symbols occurring on a line is 1 in 1000.

If the player had bet 3 credits with 1 credit per line on 3 lines, the chance of 3 or more jackpot symbols occurring on a line is 1 in 1000. The chance of winning on any line is 3 in 1000. For a bet of 3 the chance of win is 1 in 1000.

This player bet 15 credits, has 3 chances (3 lines) to win a jackpot. The chance of 3 or more jackpot symbols occurring on a line is 1 in 1000. The chance of winning on any line is 3 in 1000. This is not fair compared to the player betting 1 credit per line, so this player is given the chance to flip. The chances of selecting jackpot symbols by flipping are increased so that after flipping the chance of winning a jackpot on a line is 5 in 1000. Thus the player has bet 15 credits and has 3 lines on which to win at the chance of 5 in 1000. The total chance per credit bet is 1 in 1000.

Example 2—Winning a Jackpot by Combinations Scattered Anywhere in the Window

Player is playing 3 lines and bet 5 credits per line.

Jackpots are won as follows 3 jackpot symbols anywhere in the window pay a mini jackpot 4 jackpot symbols anywhere in the window pay a minor jackpot 5 jackpot symbols anywhere in the window pay a major jackpot The rules of the game define 1. The player has the right to flip a symbol whenever one or more jackpot symbols appears anywhere in the window.
2. The number of flips is equal to the number of credits bet per line multiplied by the number of lines played.
3. A symbol can be flipped more than once
4. The reel strips remain constant for all bets per line.

The reels spin and the player sees

| | | | | |
|---|---|---|---|---|
| A | K | Q | J | 10 |
| 9 | J | JACKPOT | A | K |
| J | 10 | 9 | Q | A |

No prize is payable but because a Jackpot symbol is in the window, the player has the right to flip. The number of flips is equal to the bet per line multiplied by the number of lines played which is 5*3=15.

The player flips the symbols on the centre line on reels 1, 2, 4 and 5 and all symbols on the top line and all symbols on the bottom line The result is

| | | | | |
|---|---|---|---|---|
| 10 | 9 | Q | K | JACKPOT |
| A | K | JACKPOT | J | 7 |
| Q | J | 10 | JACKPOT | K |

The player has 1 flip remaining. The player selects to flip the centre line reel 1

The result is

| | | | | |
|---|---|---|---|---|
| 10 | 9 | Q | K | JACKPOT |
| JACKPOT | K | JACKPOT | J | 7 |
| Q | J | 10 | JACKPOT | K |

The outcome is evaluated and the player has 4 jackpots in the window. Player wins the minor jackpot.

The above examples are two examples only of the types of games that may be played using the present invention. It will be appreciated that the present invention may be implemented in a number of other ways, depending upon game design.

Figure 13:
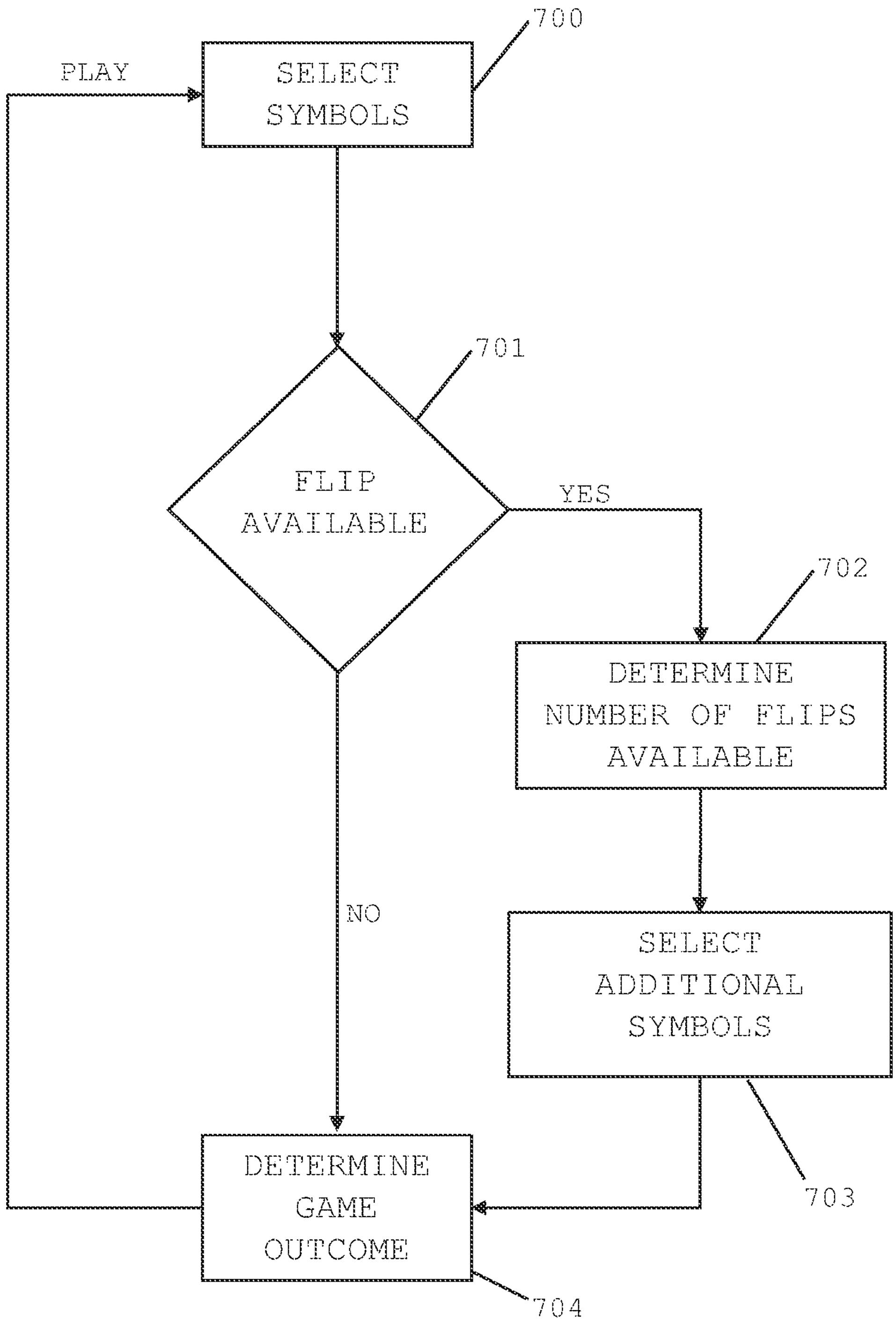
FIG. 13 is a flow diagram illustrating operation of a gaming system in accordance with an embodiment of the present invention.

A game playing process in accordance with an embodiment of the present invention will now be summarised with reference to FIG. 13. At step 700 the game is played by selection of symbols from the symbol store 303 by the symbol selector 302. At step 701, determination is made as to whether or not any additional symbols are available (this may depend on player credit, a combination of symbols appearing in the originally selected symbols, or any other trigger, as discussed above). If a flip is available, at step 702 a determination is made of the number of flips available. For example, in this embodiment the number of flips depends upon the amount of player credit per line entered. The amount of credit is determined and the number of flips is determined. At step 703 the flips are carried out and any additional symbols are revealed. If no flip is available, the game outcome is determined at step 704, on the basis of only the originally selected symbols. Where a flip has occurred, the next step is to determine the game outcome (step 704) based on the additional symbols.

In the above described embodiment, the originally selected symbols are flipped to reveal jackpot symbols or blanks. The additional symbols are not limited to jackpot symbols or blanks. Any additional symbol may be revealed by a flip, depending upon the game being played. For example, if the game being played is a poker type game, additional card symbols may be revealed by the flip to improve the player's hand. In a further example, a jackpot may be won by a particular combination of standard symbols e.g. card symbols, and the flip may enable the combination to be completed if the appropriate symbol is revealed by the flip.

In the above described embodiment, the game example shows the use of additional symbols to improve the chances of a player winning a jackpot. This invention is not limited to providing games with improved jackpot chances. Additional symbols may be utilised to provide more chance of winning any type of prize, including a combination, a feature, a bonus or any other type of prize.

In the above embodiment, the symbols "flip" anti clockwise. The invention is not limited to this. The symbols may flip clockwise or may be flipped over and under or in any other way or direction. In other embodiments, the symbols may not be represented as flipping at all. One symbol may merely be replaced by another symbol, for example.

In the above embodiment, single symbols are flipped. The invention is not limited to this. Two symbols mounted by the same substrate may be flipped, or three symbols or more. The substrate in this case bears a plurality of symbols and may flip to reveal a plurality of symbols, or a single symbol.

In the above examples, the player is allowed to select from a plurality of symbols those which he wishes to flip. A plurality of available symbols for flipping may or may not be indicated to the player. Indication may be visual and/or audio e.g. by changing the colour of the symbol to be flipped, changing or adding a border around the symbol to be flipped, or any other manner of identification of the symbol to be flipped. In an embodiment, all of the symbols appearing on the screen may be available to be flipped (up to the number of flips available for the player). In other embodiments, the player may not get to select which symbols flip. For example, the game controller may determine which symbols are to be flipped and the flip may be carried out automatically.

In the above described embodiments, the display emulates a plurality of reels. In an alternative embodiment, the original symbol selection may be implemented as actual reels driven by a stepper motor. Additional symbols may be added by video graphics overlaying the display of the actual stepper reels. In another alternative embodiment, the replacement symbol may appear on another display. That is, the stepper position to be replaced is selected, and then a video display (which could be placed in the top box or adjacent the reels strips) displays the replacement symbol. In an alternative embodiment, a mechanical arrangement could be used to change the symbols on the stepper reels.

In another embodiment, the display may not emulate reels but merely show the selected symbols in a non-reel format e.g. presenting or emulating playing cards, or other graphical representations in a series of rows and columns.

In the embodiment described above where the player is provided with an increased chance of winning a jackpot in direct proportion to the amount of credit bet, it can be readily seen and understood by the player that the more that is bet, the more chances of flipping symbols are provided. This is an appealing way of representing to a player that they get more chances from more money bet.

Embodiments of the present invention may be implemented utilising program code. The program code may be supplied in a number of ways, for example on a computer readable medium, such as a disc or a memory, or a data signal (for example, by downloading it from a server), or in other ways.

In the claims which follow and in the preceding description of the invention, except where the context indicates otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

It is to be understood that, if any prior art publication is referred to herein, such reference does not constitute an admission that the publication forms a part of the common general knowledge in the art in any country.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. An electronic gaming device comprising:

at least one memory with instructions stored thereon; and at least one processor in communication with the at least one memory, wherein the instructions, when executed by the at least one processor, cause the at least one processor to:

determine a number of symbol replacements available in an electronic game;

cause display of a first plurality of symbols at a plurality of symbol locations;

receive an input corresponding to a first symbol of the first plurality of symbols, wherein the first symbol is displayed at a first symbol location of the plurality of symbol locations;

determine a replacement symbol to replace the first symbol in response to receiving the input, wherein the replacement symbol is determined based upon an input amount associated with the electronic game and from an adjustable plurality of symbols for the electronic game, wherein the adjustable plurality of symbols is adjusted to include more symbols as input amounts for the electronic game increase;

cause display of a rotation of the first symbol at the first symbol location, wherein the replacement symbol is displayed at the first symbol location after the rotation is complete; and determine an output to be provided, wherein the output is associated with a second plurality of symbols, and wherein the second plurality of symbols includes the replacement symbol.

2. The electronic gaming device of claim 1, wherein the instructions, when executed, further cause the at least one processor to:

determine the input amount, wherein the input amount comprises a number of credits; and determine the number of symbol replacements based on the input amount.

3. The electronic gaming device of claim 2, wherein the replacement symbol comprises a jackpot symbol, and wherein a number of jackpot symbols eligible to be replacement symbol are adjustable in proportion to the input amount.

4. The electronic gaming device of claim 1, wherein the instructions, when executed, further cause the at least one processor to:

receive a message from a gaming server; and cause display of the first plurality of symbols based on the message.

5. The electronic gaming device of claim 1, wherein the instructions, when executed, further cause the at least one processor to:

receive a message from a gaming server; and cause display of the rotation of the first symbol based on the message.

6. The electronic gaming device of claim 1, wherein the instructions, when executed, further cause the at least one processor to receive the input as a message from a gaming server.

7. The electronic gaming device of claim 1, wherein the instructions, when executed, further cause the processor to cause at least one of an audio output or a visual output indicating the first symbol will be replaced.

8. The electronic gaming device of claim 1, wherein the replacement symbol comprises a blank symbol.

9. A method of providing an electronic game implemented by at least one processor in communication with at least one memory, the method comprising:

determining a number of symbol replacements available in an electronic game;

causing display of a first plurality of symbols at a plurality of symbol locations;

receiving an input corresponding to a first symbol of the first plurality of symbols, wherein the first symbol is displayed at a first symbol location of the plurality of symbol locations;

determining a replacement symbol to replace the first symbol based on receiving the input, wherein the replacement symbol is determined based upon an input amount associated with the electronic game and from an adjustable plurality of symbols for the electronic game, wherein the adjustable plurality of symbols is adjusted to include more symbols as input amounts for the electronic game increase;

causing display of a rotation of the first symbol at the first symbol location, wherein the replacement symbol is displayed at the first symbol location after the rotation is complete; and determining an output to be provided, wherein the output is associated with a second plurality of symbols, and wherein the second plurality of symbols includes the replacement symbol.

10. The method of claim 9, further comprising:

determining the input amount, wherein the input amount comprises a number of credits; and determining the number of symbol replacements based on the input amount.

11. The method of claim 10, wherein the replacement symbol comprises a jackpot symbol, and wherein a number of jackpot symbols eligible to be replacement symbol are adjustable in proportion to the input amount.

12. The method of claim 9, further comprising:

receiving a message from a gaming server; and causing display of the first plurality of symbols in response to receiving the message.

13. The method of claim 9, further comprising:

receiving a message from a gaming server; and causing display of the rotation of the first symbol in response to receiving the message.

14. The method of claim 9, further comprising receiving the input in a message transmitted from a gaming server.

15. The method of claim 9, further comprising causing at least one of an audio output or a visual output indicating the first symbol will be replaced.

16. At least one non-transitory computer-readable storage medium with instructions stored thereon that, in response to execution by at least one processor, cause the at least one processor to:

identify a number of symbol replacements available in an electronic game;

cause display of a first plurality of symbols at a plurality of symbol locations;

receive an input corresponding to a first symbol of the first plurality of symbols, wherein the first symbol is displayed at a first symbol location of the plurality of symbol locations;

identify a replacement symbol to replace the first symbol in response to receiving the input, wherein the replacement symbol is identified based upon an input amount associated with the electronic game and from an adjustable plurality of symbols for the electronic game, wherein the adjustable plurality of symbols is adjusted to include more symbols as input amounts for the electronic game increase;

cause display of a rotation of the first symbol at the first symbol location, wherein the replacement symbol is displayed at the first symbol location after the rotation is complete; and identify an output to be provided, wherein the output is associated with a second plurality of symbols, and wherein the second plurality of symbols includes the replacement symbol.

17. The at least one non-transitory computer-readable storage medium of claim 16, wherein the instructions further cause the at least one processor to:

identify the input amount, wherein the input amount comprises a number of credits; and identify the number of symbol replacements based on the input amount.

18. The at least one non-transitory computer-readable storage medium of claim 16, wherein the instructions further cause the at least one processor to cause display of the first plurality of symbols by transmitting a message to an electronic device, wherein the electronic device displays the first plurality of symbols based on the message.

19. The at least one non-transitory computer-readable storage medium of claim 16, wherein the instructions further cause the at least one processor to cause display of the rotation of the first symbol by transmitting a message to an electronic device, wherein the electronic device displays the rotation based on the message.

20. The at least one non-transitory computer-readable storage medium of claim 16, wherein the instructions further cause the at least one processor to receive the input from an electronic device.

* * * * *